Patented Feb. 16, 1926.

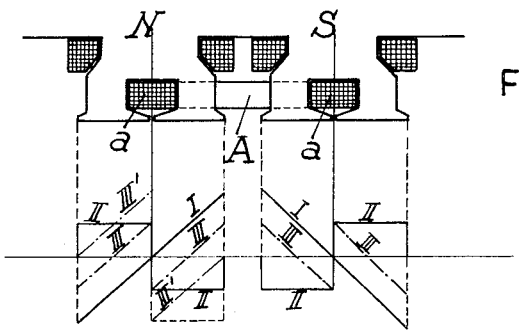
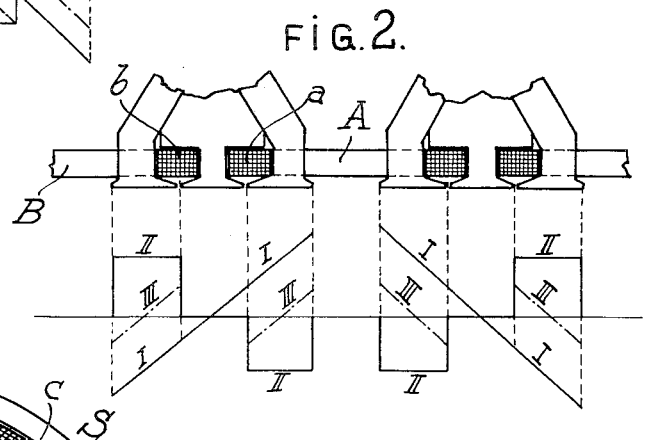
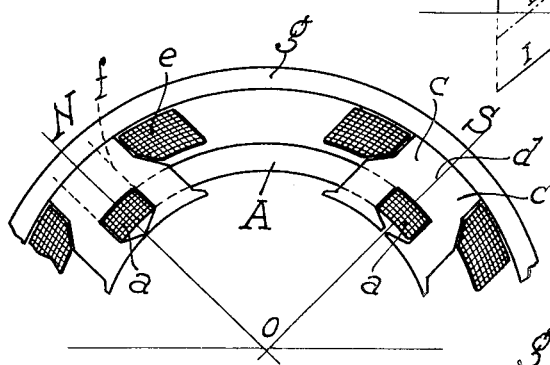
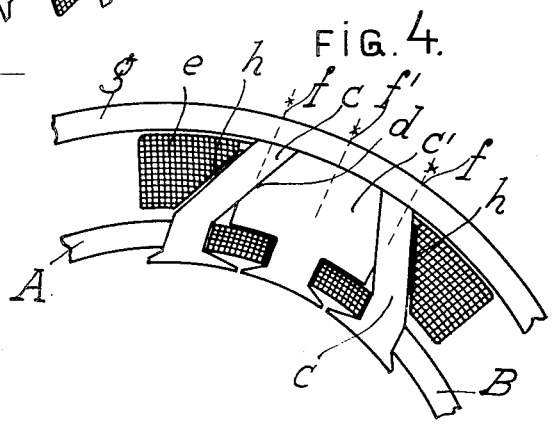

1,573,335

UNITED STATES PATENT OFFICE.

LAJOS TORDA, OF BUDAPEST, HUNGARY.

ARRANGEMENT FOR THE COMPENSATING WINDINGS OF COMMUTATOR MOTORS WITH SALIENT POLES.

Application filed March 22, 1924. Serial No. 701,164.

*To all whom it may concern:*

Be it known that I, LAJOS TORDA, a citizen of Hungary, residing at Budapest, Hungary, have invented certain new and useful Improvements in an Arrangement for the Compensating Windings of Commutator Motors with Salient Poles, of which the following is a specification.

The invention relates to an arrangement for the compensating windings of commutator motors with salient poles and its chief object is to permit of reducing the radial dimensions as far as possible.

It is especially important in the case of railway or crane motors in order to obtain the maximum power within a limited space that the radial dimensions of the motors be reduced as much as possible. In the case of machines with salient poles it is therefore desirable to shorten the pole shanks, that is to say, the field magnet coils, as much as possible and this is possible by a reduction of the air gap as far as practicable, since the magnetic resistance to be overcome is thereby substantially reduced. On mechanical grounds this reduction of the air gap can be attained by the employment of ball or roller bearings but a limit to this reduction is put by the distortion produced by armature reaction.

In order to overcome this distortion of the field, a compensating winding must be provided, which arrangement however is apt to be precluded particularly in the case of railway motors by the fact that the known arrangements of the compensating winding, not only are substantially increasing the initial cost of the motors, but also introduce difficulties in the comparatively frequent repairs to which railway motors must be subjected, since the compensating windings are more or less equally distributed over the pole faces and must therefore be wound in slots.

Since it is possible and more convenient to concentrate the compensating winding, according to the invention the intervening space between two neighbouring poles is bridged across by a single compensating winding, and the slots in the pole pieces serving for the reception of the compensating winding are so arranged that they divide the pole faces into substantially equal parts.

It is however important to arrange that the compensating ampere-turns of a pole shall be smaller than the armature ampere-turns embraced by a pole-shoe but larger than a quarter of this number.

With such an arrangement of concentrated compensating windings, coils ready wound on formers can be used, so that it is easily possible to insert and remove the compensating winding as well as the field magnet coils in the case of any repairs which may be necessary.

The conditions created by the new arrangement are shown in Fig. 1 for the case in which only each second pair of poles are connected together, and In Fig. 2 for the case in which all the poles are connected in pairs.

Fig. 3 shows a part-sectional elevation of a four pole machine with an arrangement of compensating coils corresponding to Fig. 1, while Fig. 4 shows one example of the magnet shanks for the arrangement of the compensating coils indicated in Fig. 2.

As may be seen from Figs. 1 and 3 each pair of poles N—S has a common compensating coil A of which each side $a$ lies in the mid-plane of the corresponding pole-shoe so that the appropriate side $a$ of the compensating coil divides each pole face into two equal parts.

As may be seen from Fig. 1 the magnetic conditions produced are the following:—
The full line I indicates the condition of the armature field in the region of the individual pole faces. The armature field has its greatest value at the two edges of the pole faces, while in the middle of the pole face it is zero. Consequently the direction of the armature field at the two edges of the pole face is reversed.

The full line II indicates the strength of the field produced by the compensating coil A in the region of the pole face. This field is of equal strength over the whole of the pole face but changes its direction at the middle point of each pole face. The value of the field resulting from the armature field and the compensating field along the pole faces is shown by means of the thick chain dotted line III.

In the case shown in Fig. 1, it is assumed that the ampere-turns producing the compensating field over one pole face amount to half the ampere-turns of the armature field embraced by the pole face. Under these circumstances the maximum value of the resultant field at one edge of the pole face is only half the maximum value of the armature field, and this value decreases regularly for the first quarter of the arc embraced by the pole and increases in the reverse direction to the middle of this arc, then amounting to half the maximum value of the armature field. On the other side of the middle of the pole arc the direction of the resultant field alters but its strength is similarly only half the maximum value of the armature field. This field strength decreases regularly to zero over the third quarter of the pole arc and then increases in the opposite direction up to its maximum value which is again equal to half the maximum value of the armature field and which is attained at the other pole edge.

It will therefore be seen that the gradations in the main field generated by the armature field have been divided by the described arrangement into two parts each of half the value.

This desirable result is attained if the compensating ampere-turns for the pole faces are half the armature ampere-turns embraced by the pole faces. In case of any deviation from these proportions the result is not so favourable, for instance if the number of ampere-turns of the compensating field is reduced, the field strength at the edges of the pole face increases above the value corresponding to the thick chain dotted line, which is objectionable for the purpose of commutation. If on the other hand the number of ampere-turns of the compensating field is increased with respect to the above mentioned value, the field strength in the middle of the field arc certainly increases above that indicated by the chain dotted line III which is not prejudicial to good commutation; however the strength of the resultant field at the edges of the poles can be reduced to zero by increasing the ampere-turns of the compensating winding up to the ampere-turns of the armature embraced by the pole face as is shown by the light chain dotted line III'. This advantage is however obtained at the expense of increased size of the compensating winding.

In the arrangement shown in Fig. 2, each pair of poles is connected by a compensating winding A or B so that for each pole face there are two coil sides $a$ or $b$. The two coil sides $a$ and $b$ are arrranged in such a manner that they divide the pole face into three equal parts. Under the conditions chosen for illustration in Fig. 2, the ampere-turns in the two slots of the pole face are assumed equal, so that in the middle section of the pole arc there is no compensating field and this is limited to the two outer pole portions. At the edges of the middle pole portion the maximum value of the armature field is only one third of that at the outermost edges of the pole face. The resultant field for the two outer pole portions has its highest value a minimum for a definite value of the compensating ampere-turns per pole. which is in the case where the compensating field is two thirds of the maximum value of the armature field, as is shown in Fig. 2, by the line II. The resultant field produced under these circumstances is shown by the chain dotted line III. These most favourable conditions can be departed from more or less but the ampere-turns of the compensating field should not be less than a quarter of the armature ampere-turns embraced by the pole shoe and on the other hand should not exceed them.

In order that the compensating coils per pole face may be concentrated in one or at most in two slots, the magnet shanks can be so constructed, that the previously wound compensating coils can be inserted in the slots serving for their reception, which slots are almost completely closed, by arranging for the iron core of the magnet shanks to be divided by a plane cutting the slot for the reception of the compensating winding.

According to Fig. 3 the whole shank $c$ is divided at its mid-plane by the plane $d$ and the two parts are connected in the transverse directions by screws.

The assembly of the motor is carried out in such a way that the two halves $c$, $c$ of each of two neighbouring magnet shanks are placed round two sides $a$ of the compensating coil A and are screwed together. Thereupon the field coils $e$ are pushed onto the magnet shank and the pair of magnet shanks connected together by the compensating coil A and provided with the field coils $e$ are screwed to the frame $g$.

In the embodiment shown in Fig. 4, the magnet shank is divided by the planes $d$ cutting each of the two slots and making an acute angle with the axis of the magnet shank while the outer faces $h$ of the magnet shank extend parallel to the dividing planes $d$. In consequence of this, assembly may be carried out in the following manner. First the middle portion $c_1$ of the shank is connected to the frame $g$ by means of the screw $f$ and the field coil $e$ is then secured in position on the frame. Thereupon the compensating coils A and B are inserted in the half slots of the middle portion $c_1$ of the pole shoe. The two side pieces $c$, $c$ of the magnet shank can now be pushed into position in the oblique opening between the middle portion $c_1$ and oblique inner faces of the field coils $e$ and can then be secured by screws $f$.

By means of the above described arrangement not only may the motor be made smaller as regards its radial dimension, but in consequence of the reduction of the field copper the manufacturing costs are reduced and also the efficiency is increased in consequence of the smaller energizing losses. A further advantage arises if inter-poles and inter-pole windings are provided in that the dimensions of these can be made smaller since a portion of the magneto-motive-force of the armature is already compensated. The above arrangement can be employed either for direct current or alternating current commutator machines.

Having now particularly described and ascertained the nature of my said invention and in what manner the same is to be performed, I declare that what I claim is:

1. An electric commutator motor having in combination, an armature provided with armature windings, a field having salient poles provided with field windings and pole shoes, the air gap between the pole faces of said shoes and said armature being substantially uniform, neighboring poles of said field being bridged by a single compensating winding situated in recesses beneath the pole faces dividing the pole faces into substantially equal parts, the ratio of the ampere turns of said compensating winding to the ampere turns of the armature winding embraced by each pole face being greater than one-fourth and less than unity.

2. An electric commutator motor having in combination, an armature provided with armature windings, a field comprising a frame carrying salient pole pieces divided on longitudinal planes, field windings about said pole pieces, neighboring pole pieces being bridged by formed compensating windings carried in slots in said pole pieces, which slots are beneath the pole faces and are intersected by said longitudinal planes.

3. An electric commutator motor having in combination, an armature provided with armature windings, a field comprising a frame carrying salient pole pieces each divided by a plurality of planes at an angle to the axis of said pole piece, field windings for said pole pieces, slots in said pole pieces beneath the pole faces and intersected by said planes, and formed compensating windings in said slots bridging neighboring poles.

4. An electric commutator motor having in combination, an armature provided with armature windings, a field comprising a frame carrying salient pole pieces each divided by a pair of planes at an angle to the axis of said pole piece and diverging toward the pole face, field windings about said pole pieces, slots in said pole pieces beneath the pole faces and intersected by said planes, and formed compensating windings in said slots bridging neighboring poles.

5. An electric commutator motor having in combination, an armature provided with armature windings, a field comprising a frame carrying salient pole pieces divided in longitudinal planes, the air gap between the pole faces and armature being substantially uniform, field windings about said pole pieces, said pole pieces being divided on longitudinal planes dividing the pole faces into substantially equal parts, said pole pieces having slots intersected by said longitudinal planes, and formed compensating windings in said slots bridging neighboring pole pieces.

In testimony whereof I affix my signature.

Dr. LAJOS TORDA.